No. 867,682. PATENTED OCT. 8, 1907.
F. SPAULDING & J. D. SMITH.
KINETOSCOPE.
APPLICATION FILED FEB. 21, 1907.
2 SHEETS—SHEET 1.
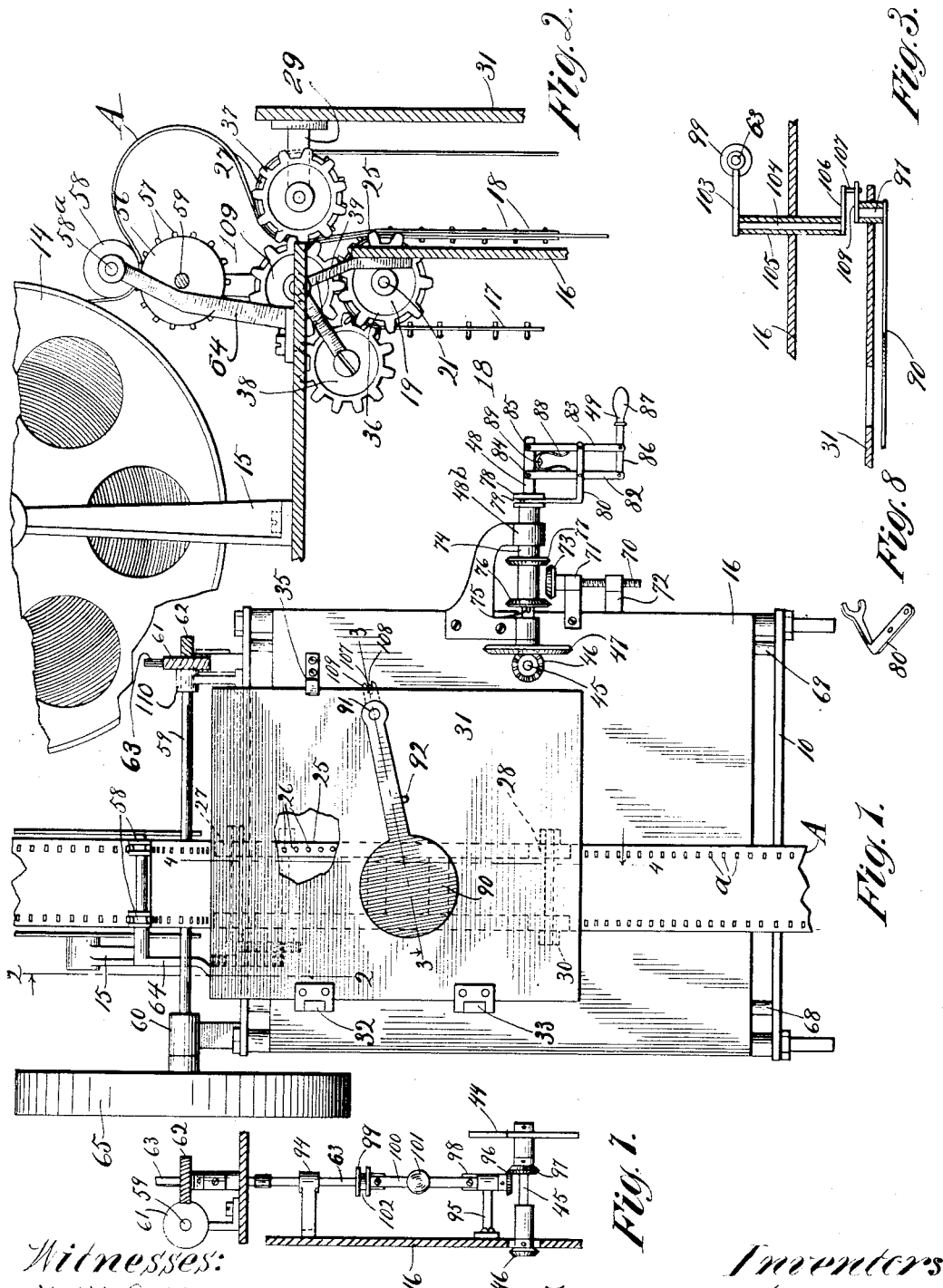
Witnesses:
W. H. Cotton
Charles B. Gillson.
Inventors.
Franklin Spaulding
James D. Smith.
By Louis K. Gillson Atty.

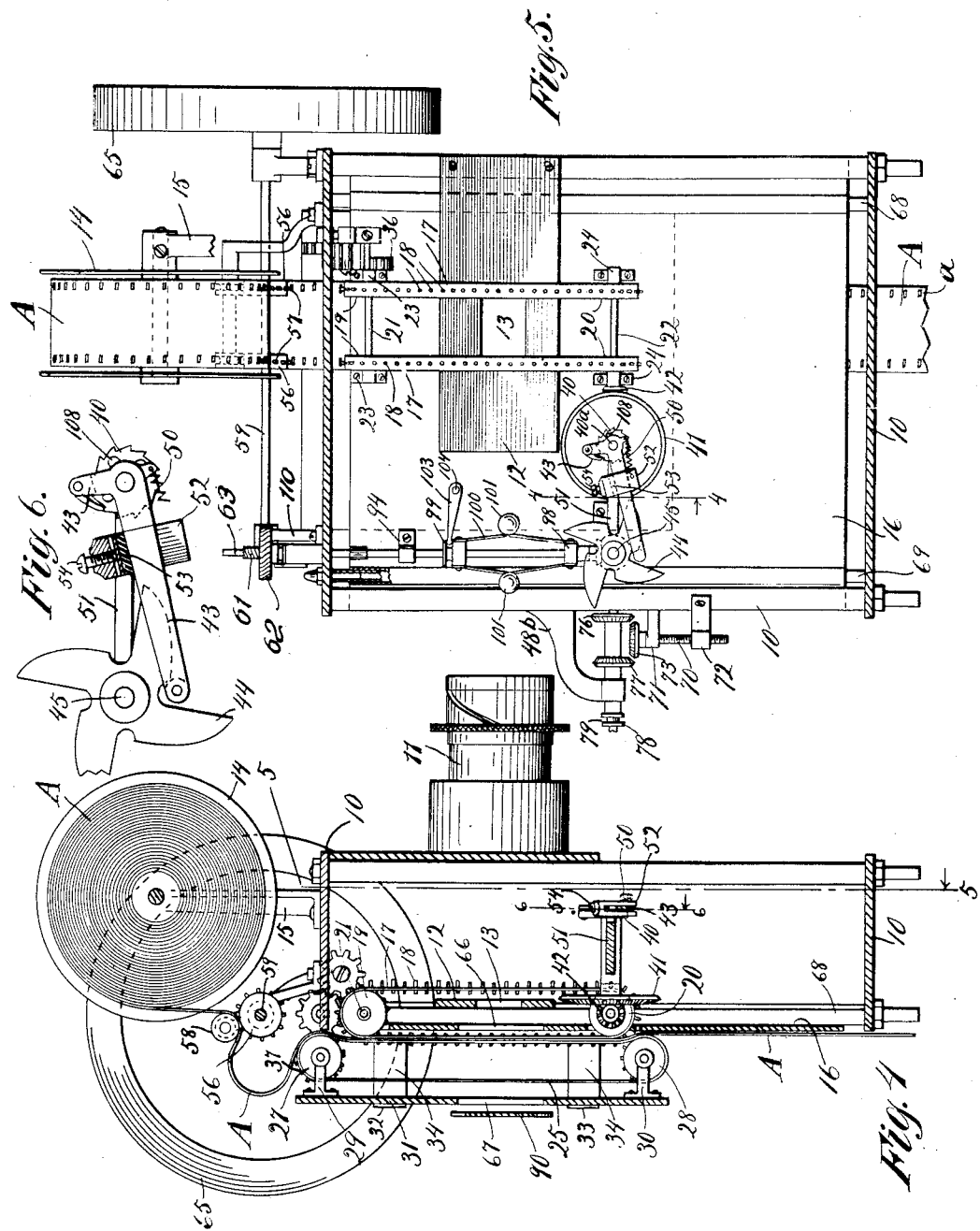

UNITED STATES PATENT OFFICE.

FRANKLIN SPAULDING AND JAMES D. SMITH, OF CHICAGO, ILLINOIS, ASSIGNORS OF ONE-THIRD TO CHICAGO FILM EXCHANGE, A CORPORATION OF ILLINOIS.

KINETOSCOPE.

No. 867,682.  Specification of Letters Patent.  Patented Oct. 8, 1907.

Application filed February 21, 1907. Serial No. 358,624.

*To all whom it may concern:*

Be it known that we, FRANKLIN SPAULDING and JAMES D. SMITH, citizens of the United States, and residents of Chicago, county of Cook, and State of Illinois, have invented certain new and useful Improvements in Kinetoscopes, of which the following is a specification, and which are illustrated in the accompanying drawings, forming a part thereof.

The invention relates to kinetoscopes comprising mechanism for rapidly presenting successive portions of a continuous picture film to the optical field of a projecting lens; and the object of the invention is to provide improved means for adjusting the film-advancing mechanism whereby the pictures on the film may be accurately brought into register with the lens at each advance of the film.

The invention is exemplified in the structure to be hereinafter described, and illustrated in the accompanying drawings, in which Figure 1 is a front elevation of a device constructed according to the invention; Fig. 2 is a detail vertical longitudinal section of the same, taken on the line 2—2 of Fig. 1; Fig. 3 is a detail plan section taken on the line 3—3 of Fig. 1; Fig. 4 is a vertical section viewed from the lines 4—4 of Figs. 1 and 5; Figs. 5 and 6 are sectional views taken on the lines 5—5 and 6—6, respectively, of Fig. 4; Fig. 7 is a detail section taken on the line 7—7 of Fig. 5; and Fig. 8 shows a detail of construction separated from other parts.

The kinetoscope illustrated in the drawings is of that form adapted for the projection of images upon a screen. It comprises a rectangular carrying frame 10, adapted to be placed in front of a suitable source of light, not shown, and having a projecting lens tube 11. A diaphragm 12, having a central aperture 13 commensurate in size with each of the images on the film or tape, serves to cut off from the lens all light emitted from the lamp or other source, except that which passes through the image. As shown this diaphragm 12 is fixed in position on the carrying frame directly in front of the lens-tube 13.

A reel 14 is provided for carrying the film A, and is preferably rotatably mounted at the top of a standard 15 rising from the frame 10.

Mechanism is provided for causing the tape or film from the reel 14 to pass the diaphragm opening 13 with a rapid intermittent movement. As shown, this mechanism is carried by a plate 16 mounted on the frame 10 immediately in front of the diaphragm 12, and comprises a pair of feed belts 17, each having a row of pins or studs 18 designed to engage with apertures $a$ provided at each edge of the tape or film A. Each of these feed belts turns over a pair of sprockets 19, 20, arranged above and below the diaphragm aperture 13, and preferably the sprockets of each pair are mounted together on rotating axles, as 21, 22, journaled in brackets 23, 24, secured to the plate 16.

For maintaining the film in contact with the feed belts 17, a second feed belt 25 moves in front of the forward lap of each of the belts 17, the tape A passing between the belts. As shown each of the belts 25 is provided with a plurality of apertures 26, which receive the ends of the studs 18, and each turns over sprockets 27, 28, which are preferably arranged a greater distance apart than the sprockets 19, 20, carrying the feed belts 17.

In order that the feed belts 25 may be withdrawn from contact with the feed belts 17 to permit of access to the tape A between the belts, the sprockets 27, 28, are journaled in brackets 29, 30, respectively, carried by a movable plate or door 31, which is connected to the plate 16 by hinges 32, 33. Preferably one leg, as 34, of each of the hinges 32, 33, is of considerable length in order that the plate 16 and door 31 may be spaced apart a sufficient distance to permit the feed belts 25 to turn between them. A clasp 35 (Fig. 1) serves for securing the door in the closed position. As shown the inner edge of each of the sprockets 27, 28, projects somewhat beyond the plane occupied by the forward lap of each of the feed belts 17 when the door 31 is closed, thereby insuring immediate contact between each of the feed belts 17 and 25 and the tape A, one lap of each of the belts 25 being slightly deflected by the sprockets 19, 20.

To insure the registration of the studs or pins 18 carried by the feed belts 17 within the apertures 26 of the feed belts 25, whenever the door 31 is closed, gear pinions 36 and 37, having teeth of the same pitch as that of the studs 18 (Fig. 2), are mounted on the axle 21 of the sprockets 19 and the rotating axle of the sprockets 27, respectively, and these sprockets are connected by idle gears 38 and 109, journaled in a bracket 39, rising from the plate 16.

A ratchet wheel 40 is provided for driving the feed belt 17 and, as shown, is fixed upon a shaft $40^a$, which is journaled in a bracket 51 formed on the face of the plate 16 and is operatively connected, by gears 41, 42, to the rotating axle 22 of the lower sprockets 20. The ratchet wheel 40 is engaged by a pawl-arm 43 to advance the feed belts 17. The pawl-arm is pivotally mounted on the ratchet shaft $40^a$, and is adapted to be oscillated in a vertical plane by a cam 44, mounted on the inner end of a horizontal shaft 45. The shaft 45, as shown, extends through the plate 16 in which it is journaled, and is connected by gears 46, 47, with a driving shaft 48, journaled on the outer face of the plate 16 at $48^a$, and in a bracket projecting from the side of that plate at $48^b$. At the outer end of the driving shaft 48 is mounted a crank-handle 49. A friction washer 108 bears on the face of the ratchet wheel 40 to prevent the parts from turning in advance of the pawl. The pawl-arm 43 is retracted by a spring 50, which reacts between the pawl-arm and the bracket 51, and to reduce the noise incident to the vibration of the pawl-arm 43 a cushion 53 is provided for buffing its retractive movement. As shown this cushion is mounted at the base of a fork 52, formed in the outer end of the bracket 51 and straddling the pawl-arm 43, and the height of the cushion is rendered adjustable by a set-screw 54 entering the fork 52 from above and bearing downwardly on the cushion.

Provision is made for withdrawing the film A from the reel 14 in advance of the feed belts 17 and 25 by a continuous movement, for otherwise the inertia of the reel would cause the film to be torn by the intermittent movement of the feed belts. To this end sprockets 56, having studs 57 for engaging the apertures a at each side of the film, are mounted on a shaft 59 journaled in front of the reel 14. As shown the sprocket shaft 59 is carried by the brackets 60 and 110, rising from the frame 10. A guide-roll 58, rotatably mounted on an arm 58ᵃ extending in front of the reel from a standard 64, coöperates with each of the sprockets 56 to withdraw the film from the reel. For driving the sprockets 56 the shaft 59 is operatively connected by spiral gears 61, 62, with a vertical shaft 63 journaled in brackets 94, 95, carried by the plate 16. At the foot of this vertical shaft is a gear pinion 96 which meshes with a gear 97, carried by the cam shaft 45. A fly-wheel 65, of sufficient weight to insure a uniform movement of the mechanism, is carried by one of its continuously-rotating parts, and as shown is mounted at the outer end of the horizontal shaft 59.

The plate 16 and door 31 each have an aperture, as 66, 67, respectively, for permitting the passage of light to that part of the film which is in front of the diaphragm aperture 13. To insure the images on the film coming into register with the diaphragm aperture 13 at each successive advance of the feed mechanism, the apertures 66 and 67 are wider than the diaphragm aperture 13 and the plate 16 is vertically adjustable in the frame 10.

As is most clearly shown in Figs. 1 and 5 of the drawings, the plate 16 is slidably mounted on vertical ways 68, 69, and is supported in any adjusted position by an elevating screw 70, journaled in a bracket-arm 71 projecting from one side of the plate 16 and having a threaded engagement with a similar bracket-arm 72 projecting from the side of the frame 10. The spiral gear 61 carried by the vertical shaft 63 for driving the horizontal shaft 59, has a sliding engagement with the shaft 63 in order that it may not be disengaged from the gear 62 by vertical movement of the plate 16.

It is sometimes necessary, as when a splice in the film A is reached, to vertically adjust the plate 16, by turning the elevating screw 70, when the device is in operation. This adjustment is termed "framing up" the picture exhibited on the screen (not shown), and by means of the invention it is effected from the rotating parts of the tape-feeding mechanism and is controlled by the hand of the attendant on the crank-handle 49. As shown, a sleeve 74 is slidably mounted on the driving shaft 48 and is fixed against rotation thereon by a spline 75. Gears 76, 77, are formed on this sleeve, and a gear pinion 73 is mounted at the head of the elevating screw 70 between the gears 76, 77. To cause one or the other of the gears 76, 77, to engage with the gear pinion 73, the sleeve 74 is shifted longitudinally on the driving shaft 48.

Preferably the sleeve 74 extends through the outer journal bearing 48ᵇ of the driving shaft 48, and has formed at its outer end a collar 78 having a circumferential groove 79. The crank-arm of the handle 49 is made shiftable, and carries an arm 80 having its inner end forked and entering the groove 79 of the collar 78. As shown the crank-arm of the handle 49 comprises a pair of parallel bars 82, 83, each pivotally secured to the driving shaft 48 at 84, 85, respectively, and these parallel arms are connected intermediate their ends by the arm 80 which leads to the sleeve 74, and at their outer ends by a strap 86 which carries the grip piece 87 of the crank-handle 49. A spring 88, secured to the driving shaft 48 at 89, reacts between the arms 82, 83, of the crank handle to yieldingly maintain them in mid position.

A shutter 90 is provided for closing the aperture 67 in the door 31, and provision is made for automatically opening this shutter when the parts of the machine have attained a certain speed, and for permitting the shutter to close when the speed of the machine is reduced. As shown this shutter is pivotally secured to the door at 91 and is supported, when in the closed position, by a stop 92. Fixed and movable collars 98, 99, respectively, are mounted on the vertical shaft 63, and these collars are connected by elastic flexible straps 100, which are weighted intermediate their ends after the manner of an engine governor, as shown at 101. The movable collar 99 is provided with a circumferential groove 102, and the end of a crank-arm 103, formed at one end of a rock shaft 104 journaled in the plate 16 at 105, enters the groove 102. At the opposite end of the rock shaft 104 is a crank-arm 106, carrying a wrist pin 107 which enters the bifurcated end 108 of a crank-arm 109, carried by the pivot 91 of the shutter 90. If the door 31 be opened the crank-arm 109 becomes disengaged from the wrist pin 107 and the shutter 90 is then supported in the closed position by the stop 92, but whenever the door 31 is closed the shifting of the movable collar 99 on the vertical shaft 93 is communicated to the shutter through the rock shaft 104.

In starting the machine the film A from the reel 14 will be threaded between the feed belts 17 and 25, by opening the door 31, in such a way as to leave a certain amount of slack between the sprocket 56 and the feed belts. The machine is then driven by turning the hand crank 49, and when the parts have attained such a speed that the centrifugal force of the weights 101 (Fig. 5) overcomes the elasticity of the straps 100, the shutter 90 will be raised, by the shifting of the collar 99, to permit light to pass through the film to the projecting lens tube 11.

The film A is withdrawn from the reel 14 by a continuous movement of the sprockets 56, transmitted from the driving shaft 48 through the vertical shaft 63, and passes the diaphragm aperture 13 with a rapid intermittent movement transmitted to it by the feed belts 17 and 25, which are driven by the pawl arm 43 (Fig. 6) actuated from the driving shaft 48 through the cam shaft 45. The film is delivered from the feed belts 17, 25, into any suitable form of receptacle, and may be rewound on the reel 14 whenever the whole or any desired portion of it has been exhibited.

If for any reason the images (not shown) on the film A do not register with the diaphragm aperture 13 at each advance of the film, the entire feed mechanism may be shifted by raising or lowering the plate 16, the diaphragm 12 remaining stationary. This raising or lowering of the plate 16 is effected by turning the elevating screw 70 (Fig. 1), and the screw 70 is turned from the rotating parts of the feed mechanism if longitudinal pressure be applied to the hand crank 49, inward pressure on this crank, as shown, causing the gear 77 to engage with the gear 73 at the head of the screw 70 to raise the plate 16, if the hand crank be turned to the right, while if the hand crank 49 be pulled outwardly as it is turned the gear 76 will engage with the gear 73 and rotate the screw 70 to lower the plate 16. Normally, the hand crank 49 is maintained in mid position, both of the gears 76 and 77 being then disengaged from the gear 73 by a spring 88. It will be seen, therefore, that the driving of the feed mechanism and the vertical adjusting of the picture require the use of but one hand of the attendant.

While we have shown and described improved means, including the feed belts 17 and 25, for advancing the picture film A, we do not herein claim the same as our joint invention, as it is the sole invention of Franklin Spaulding.

We claim as our invention—

1. In a kinetoscope, in combination, a carrying frame, a lens carried thereby, an apertured plate slidably mounted on the frame in front of the lens, an elevating screw supporting the plate, film-feeding mechanism including a driving shaft mounted on the apertured plate, a hand crank shiftably mounted on the driving shaft, and means controllable by the hand crank for driving the elevating screw in either direction.

2. In a kinetoscope, in combination, a carrying frame, a lens carried thereby, an apertured plate slidably mounted on the frame in front of the lens, an elevating screw supporting the plate, film-feeding mechanism including a driving shaft mounted on the apertured plate, a hand crank shiftably mounted on the driving shaft, and differential gear connection between the driving shaft and the elevating screw controllable by the hand crank.

3. In a kinetoscope, in combination, a carrying frame, a lens carried thereby, an apertured plate slidably mounted on the frame in front of the lens, film-feeding mechanism including a driving shaft mounted on the apertured plate, a sleeve slidable on the driving shaft and fixed against rotation thereon, oppositely facing gears formed on the sleeve, an elevating screw supporting the apertured plate, the head of the screw entering between the gears on the sleeve and being provided with gear-teeth, a crank-arm pivotally secured to the driving shaft, a spring for maintaining the crank-arm in central position, and connection between the crank-arm and the sleeve.

4. In a kinetoscope, in combination, a film-carrier, means for adjusting the carrier, and means for driving the film carrier arranged to actuate the carrier-adjusting means at the will of the operator.

5. In a kinetoscope, in combination, a film carrier, means for adjusting the carrier, and means for driving the film carrier operatively engageable with the carrier-adjusting means.

6. In a kinetoscope, in combination, a projecting lens, a film carrier shiftably mounted in front of the lens, means for shifting the carrier, and means for driving the film carrier, operatively engageable with the carrier shifting means.

7. In a kinetoscope, in combination, a projecting lens, a film carrier slidably mounted in front of the lens, an elevating screw supporting the carrier, and means for driving the film carrier operatively engageable with the screw.

8. In a kinetoscope, in combination, a projecting lens, a film carrier shiftably mounted in front of the lens, means for shifting the carrier, means for driving the carrier including a shaft and a hand crank shiftably mounted thereon, and operative connection, controlled by the hand crank, between the carrier-driving means and the carrier-shifting means.

FRANKLIN SPAULDING.
JAMES D. SMITH.

Witnesses:
FRED MEHLAM,
T. H. MITCHILL.